Patented Nov. 21, 1939

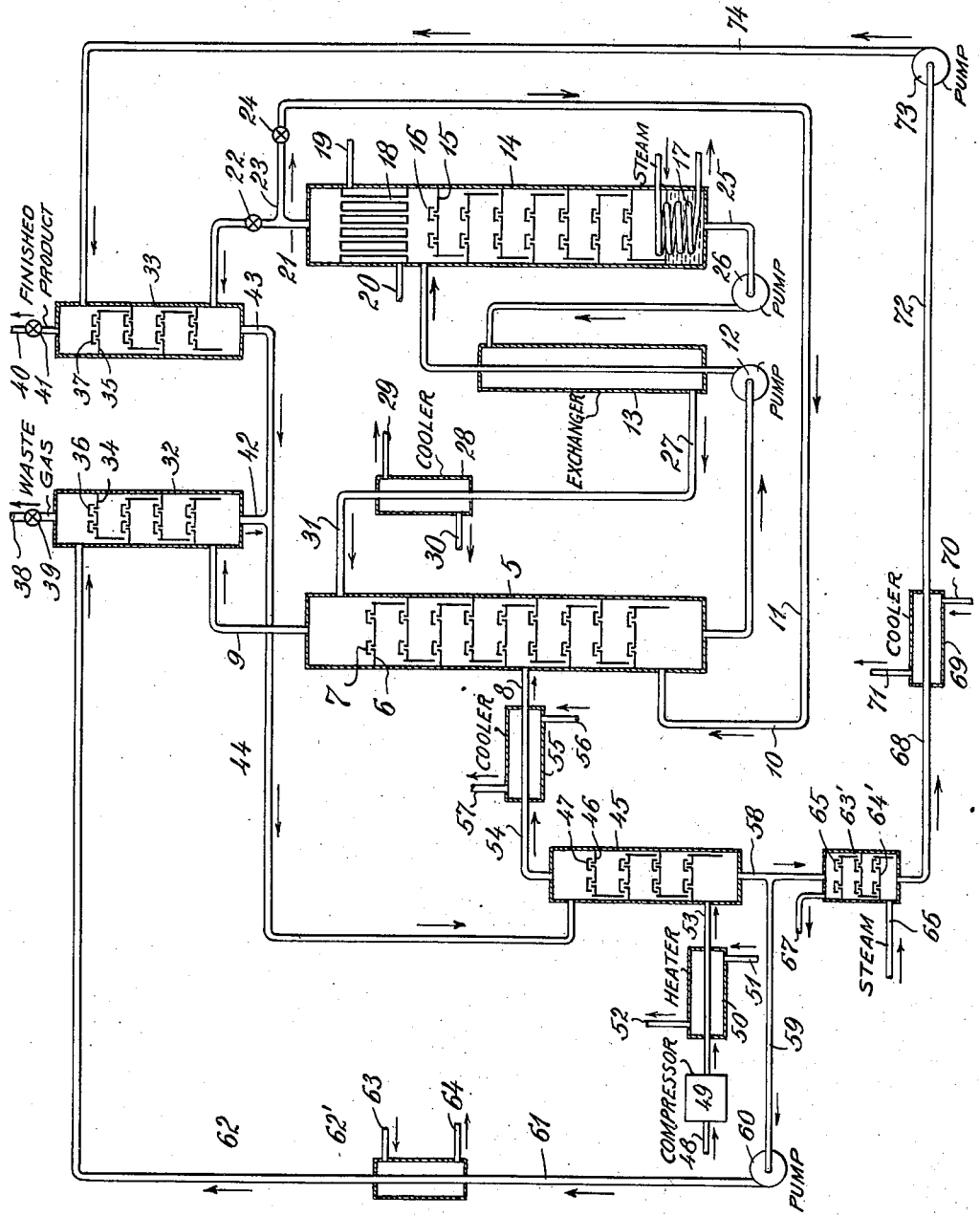

2,180,496

UNITED STATES PATENT OFFICE 2,180,496

METHOD OF RECOVERING SOLVENT EMPLOYED IN THE SEPARATION OF ACETYLENE FROM GASEOUS MIXTURES

Frederick R. Balcar, Stamford, Conn., assignor to Air Reduction Company, Incorporated, New York, N. Y., a corporation of New York Application July 30, 1937, Serial No. 156,463

7 Claims. (Cl. 260—679)

This invention relates to the separation of acetylene from gaseous mixtures and particularly to the recovery of the solvent for acetylene from the effluent gases to avoid losses thereof.

The thermal decomposition of hydrocarbons produces gaseous mixtures including acetylene. The latter may be separated by the selective action of suitable solvents, for example alkyl carbonates, ketones, ethers and esters of organic acids. Examples of such solvents are acetone or dimethyl ketone, methyl ethyl ketone, methyl normal propyl ketone, ethers of ethylene glycol, di-ethylene glycol, di-ethyl carbonate, etc. Reference is made to United States Patent No. 1,854,141 to G. F. Horsley which clearly sets forth the ideal qualities of a solvent suitable for use in separating acetylene selectively from gaseous mixtures.

Usually, the effective solvents for selective separation of acetylene have a vapor pressure at ordinary temperatures such that substantial quantities of the solvent pass out of the absorption system with the waste gases and the product. The recovery of the solvent thus withdrawn from the system is essential in order that the costs of operation may be maintained as low as possible. In the absence of a method of recovering the solvent vapors, the losses are substantial.

Solvent recovery may be effected in a number of conventional ways, for example, by refrigeration or by absorption in charcoal or other absorbent. However, the conventional methods of solvent recovery as heretofore known require considerable amounts of heat or power, which represent an undesirable addition to the cost of separating acetylene from gaseous mixtures.

It is the object of the present invention to provide an efficient and economical method of recovering solvent vapors continuously during the operation of separating acetylene from gases.

Another object of the invention is the provision of a method whereby the recovered solvent is returned immediately to the system and the medium employed for recovery is likewise available for re-use.

I have discovered that the vapors of solvents suitable for the recovery of acetylene from gaseous mixtures, such as those produced by the thermal decomposition of hydrocarbons, are as a rule sufficiently soluble in hydrocarbon oils so that the recovery of such vapors from the waste gas and from the acetylene product may be accomplished efficiently by suitable scrubbing of the gases with such hydrocarbon oils. This operation is particularly advantageous because of the relatively low solubility of acetylene in hydrocarbon oil, so that the recovery of acetylene is not affected materially by the removal of the solvent vapors therefrom. Consequently it is possible to separate acetylene efficiently and at the same time to avoid losses of the solvent employed.

As a hydrocarbon oil, I prefer to use a petroleum fraction, such as kerosene, or a fraction having a higher boiling point, such as a gas oil, or fuel oil, or a wash oil. Any other oil of higher or lower boiling point such as a cracked residue or an aromatic material or one containing unsaturated materials will be effective in condensing the solvent vapor, provided it is not objectionable because of some adverse effect due to the peculiarities of the particular material.

In carrying out the invention, the recovery of acetylene from the gaseous mixture is conducted preferably in a cyclic manner so that the entering gaseous mixture is brought into contact with the solvent and the acetylene with minor proportions of other constituents of the gaseous mixture are effectively dissolved. The solvent containing the acetylene is then subjected preferably to the action of substantially pure acetylene which displaces other constituents dissolved in the solvent. Thereafter the solvent is subjected to heat, so that the major portion of the acetylene is separated and withdrawn, leaving the solvent in condition to be returned for further treatment of the gaseous mixture. From the cycle as thus briefly outlined, waste gases will escape as the effluent from the initial step of separating acetylene from the gaseous mixture, and the portion of the acetylene recovered from the solvent will be withdrawn as the product of the operation. Both the effluent waste gas and the acetylene product will carry substantial proportions of solvent vapor.

This solvent vapor, which otherwise would be lost, is recovered by scrubbing both the effluent waste gas and the acetylene product with a hydrocarbon oil as previously described. Substantially all of the solvent vapor is dissolved in the hydrocarbon oil, so that the effluent waste gas can be discharged and utilized for any desired purpose, and the acetylene product can be stored for further use. The hydrocarbon oil containing the dissolved solvent vapors is then delivered to a scrubber where it is subjected to contact with the entering gaseous mixture, preferably at an elevated temperature, before the gaseous mixture is delivered to the scrubber wherein the acetylene is dissolved. The entering gaseous mixture separates the solvent vapors from the hydrocarbon oil, carrying them into the scrubber where the vapors are mingled with the circulating solvent and losses are thus avoided. The hydrocarbon oil, freed from the solvent vapors, may be then utilized for scrubbing the effluent waste gas and the acetylene product, thus completing the cycle.

Inasmuch as the hydrocarbon oil may possibly absorb some proportion of hydrocarbons other than acetylene, that portion of the oil which is utilized to free the acetylene product from solvent vapors is preferably treated with steam, which ensures the separation of the undesirable hydrocarbons and avoids contamination of the acetylene product. This step is unnecessary in respect to the portion of the hydrocarbon oil which is employed to free the effluent waste gas from solvent vapors.

The invention will be described in more detail with reference to the drawing, which illustrates diagrammatically an apparatus suitable for the practice of the invention, it being understood that the drawing is merely illustrative and that many of the details of the apparatus may be modified.

Referring to the drawing, 5 represents a suitable tower provided with trays 6 and the usual hats 7, adapted to ensure thorough contact of gases rising through the tower with the solvent liquid flowing downwardly therethrough. The gaseous mixture is introduced through a pipe 8, approximately midway of the length of the column, and rising through the upper part of the column, is thoroughly scrubbed with the solvent so that the acetylene is selectively removed. The effluent waste gas escapes through a pipe 9. The liquid solvent, continuing through the lower part of the column 5, is brought into contact with vapors consisting substantially of acetylene recovered as hereinafter described, and introduced through a pipe 10. The effect of the acetylene is to remove constituents such as carbon dioxide, etc., which may be dissolved during the scrubbing of the gaseous mixture in the upper section of the column.

The liquid solvent is withdrawn through a pipe 7 and delivered through a pump 12 and heat exchanger 13 to the upper part of a column 14 which is likewise provided with trays 15 and hats 16. The lower part of the column is provided with a coil 17 which is supplied with steam or other suitable heating medium. The heat thus applied to the liquid solvent separates the acetylene therefrom, and the vapors rising through the column ensure the removal of a substantial proportion of all of the acetylene dissolved in the liquid solvent. The vapors pass upwardly through a condenser 18, which is supplied with water or other cooling agent by a pipe 19, the cooling agent escaping through a pipe 20. The condenser prevents the escape of some of the vapors of the solvent, and the acetylene product is withdrawn through a pipe 21 provided with a valve 22. A portion of the acetylene is withdrawn through a pipe 23 having a valve 24, and is delivered to the pipe 10, and thence to the bottom of the column 5.

The liquid solvent from the bottom of the column 14 is withdrawn through a pipe 25 and is delivered by a pump 26 to the heat exchanger 13, where a portion of the heat is transferred to the liquid entering the column 14. A pipe 27 conveys the solvent to a cooler 28, which may be supplied with water or other cooling agent by a pipe 29, the cooling agent escaping through a pipe 30. A pipe 31 delivers the solvent to the top of the column 5, thus completing the solvent cycle.

To separate solvent vapors from the effluent waste gas and from the acetylene product, scrubbers 32 and 33 are provided with trays 34 and 35 and hats 36 and 37. The effluent waste gas enters the scrubber 32 through the pipe 9, and the acetylene product is delivered to the scrubber 33 by the pipe 21. After scrubbing, the effluent waste gas escapes through a pipe 38 provided with a valve 39, and the acetylene product is delivered through a pipe 40 having a valve 41. The hydrocarbon oil which is employed to remove the solvent vapors is delivered from the scrubbers 32 and 33 through pipes 42 and 43 to a pipe 44, which conveys it to a scrubber 45 having trays 46 and hats 47.

The gaseous mixture containing the acetylene is introduced through a pipe 48, compressed to the desired pressure in a compressor 49, and raised to the desired temperature in a heater 50 which may be supplied with steam or other suitable heating medium through a pipe 51. The heating medium escapes through a pipe 52. From the heater 50, the entering gaseous mixture is delivered by a pipe 53 to the scrubber 45, and passes upwardly in contact with the hydrocarbon oil. The solvent vapors are thus separated and delivered through a pipe 54 to a cooler 55 which may be supplied with water or other cooling agent through a pipe 56, the cooling agent escaping through a pipe 57. Thence the gaseous mixture carrying the hydrocarbon vapors enters the column 5 through the pipe 8 as previously described.

A portion of the hydrocarbon oil withdrawn from the scrubber 45 through a pipe 58 is delivered by a pipe 59 to a pump 60 which conveys it through a pipe 61 to a cooler 62'. The cooler may be supplied with water or other cooling medium through pipes 63 and 64. Thence the hydrocarbon oil passes through a pipe 62 into the top of the scrubber 32.

The other portion of the hydrocarbon oil from the pipe 58 enters a scrubber 63' provided with trays 64' and hats 65. Steam is introduced through a pipe 66 and escapes through a pipe 67 carrying with it any undesirable hydrocarbon vapors. The hydrocarbon oil is delivered through a pipe 68 to a cooler 69 which may be cooled with water or other suitable medium circulating through pipes 70 and 71. Thence the hydrocarbon oil passes through a pipe 72 to a pump 73 and is delivered through a pipe 74 to the top of the scrubber 33.

In accordance with the foregoing description, it will be observed that the absorption of acetylene in the solvent operates continuously as the gaseous mixture is introduced, the acetylene being dissolved and separated and the solvent being returned for further use. A portion of the acetylene product is utilized to preclude carrying over other soluble constituents such as carbon dioxide, etc., with the solvent. At the same time, solvent vapors which may escape with the effluent waste gas and with the acetylene product are effectively separated and are returned continuously to the column in which the initial separation of the acetylene is effected. There is, therefore, substantially no loss of solvent in the system. Similarly, the hydrocarbon oil employed for the recovery of solvent vapors is utilized without substantial loss and is continuously circulated.

Since the volume of gas escaping from the acetylene absorption cycle is equal in amount to the gas entering, the incoming gas will be sufficient in volume to remove the condensed solvent from the oil, provided that the quantity of oil used is just sufficient to condense the solvent from the gaseous products of the system under ideal conditions. In actual practice, excess oil is necessary to effect complete condensation of the solvent vapors, so that if the incoming gas is at the same temperature and pressure as the gas from which the solvent has been condensed, it will not be sufficient in amount to remove the solvent completely from the oil. In this case, it may be necessary to heat the incoming gas to a temperature higher than that of the gases leaving the absorption system, so that a given quantity of the incoming gas can remove a greater proportion of solvent vapor from the oil. The amount of heat to be supplied, however, will be much less than would be the case in any of the conventional methods of solvent recovery.

In case the acetylene absorption cycle is operated at superatmospheric pressure, the incoming gas being pumped to that pressure, the removal of the condensed solvent from the oil may be accomplished advantageously by passing the incoming gas therethrough at approximately atmospheric pressure. Since the volume of incoming gas under these conditions is greater than the volume of gas leaving the acetylene absorber at the higher pressure, it will then be more effective in carrying the solvent out of the oil and returning it to the system, and the temperature of the gas need not be so high for effective recovery of the solvent from the oil.

Since the solubility of acetylene in hydrocarbon oil is relatively low, and the volume of oil necessary to recover the solvent from the gaseous products of the acetylene absorber is small compared to the volume of gas to be treated, the quantity of acetylene lost in this method of operation due to passing the incoming acetylene-containing gas through the oil will, for all practical purposes, be negligible.

As an alternative, however, the oil, after having condensed the solvent vapor, may be treated at a more highly elevated temperature by a smaller quantity of another suitable gas such as nitrogen or a portion of the waste gas itself, this other gas then being mixed with the incoming gas before it enters the acetylene recovery system so as to return the acetylene solvent to the system.

The advantages of the method as described have been set forth, and various changes may be made in the procedure, as well as in the details of the apparatus, without departing from the invention or sacrificing any of its advantages.

I claim:

1. In the separation of acetylene from gaseous mixtures in which the gaseous mixture is brought into contact with a solvent capable of dissolving acetylene selectively from the gaseous mixture and the solvent containing dissolved acetylene subsequently is heated to liberate acetylene and the solvent from which the acetylene is liberated is returned for dissolving more acetylene; the improvement which comprises heating the gaseous mixture prior to bringing it into contact with the solvent, scrubbing the acetylene liberated from the solvent with a liquid absorbent capable of dissolving the solvent and having a higher boiling point than the solvent, and separating the dissolved solvent from the liquid absorbent by scrubbing the incoming heated gaseous mixture therewith before separation of acetylene from said gaseous mixture.

2. In the separation of acetylene from gaseous mixtures in which the gaseous mixture is brought into contact with a solvent capable of dissolving acetylene selectively from the gaseous mixture and the solvent containing dissolved acetylene subsequently is heated to liberate acetylene and the solvent from which the acetylene is liberated is returned for dissolving more acetylene; the improvement which comprises heating the gaseous mixture prior to bringing it into contact with the solvent, scrubbing the effluent gas which is not dissolved by the solvent with a liquid absorbent capable of dissolving the solvent and having a higher boiling point than the solvent, and separating the dissolved solvent from the liquid absorbent by scrubbing the incoming heated gaseous mixture therewith before separation of acetylene from said gaseous mixture.

3. In the separation of acetylene from gaseous mixtures in which the gaseous mixture is brought into contact with a solvent capable of dissolving acetylene selectively from the gaseous mixture and the solvent containing dissolved acetylene subsequently is heated to liberate acetylene and the solvent from which the acetylene is liberated is returned for dissolving more acetylene; the improvement which comprises heating the gaseous mixture prior to bringing it into contact with the solvent, scrubbing the acetylene liberated from the solvent and the effluent gas which is not dissolved by the solvent with a liquid absorbent capable of dissolving the solvent and having a higher boiling point than the solvent, separating the dissolved solvent from the liquid absorbent by scrubbing the incoming heated gaseous mixture therewith before separation of acetylene from said gaseous mixture, and returning the liquid absorbent for further use in recovering solvent.

4. In the separation of acetylene from gaseous mixtures in which the gaseous mixture is brought into contact with a solvent capable of dissolving acetylene selectively from the gaseous mixture and the solvent containing dissolved acetylene and subsequently is heated to liberate acetylene and the solvent from which the acetylene is liberated is returned for dissolving more acetylene; the improvement which comprises heating the gaseous mixture prior to bringing it into contact with the solvent, scrubbing the acetylene liberated from the solvent with a liquid absorbent capable of dissolving the solvent and having a higher boiling point than the solvent, separating the dissolved solvent from the liquid absorbent by scrubbing the incoming heated gaseous mixture therewith before separation of acetylene from said gaseous mixture, and returning the liquid absorbent for further use in recovering solvent.

5. In the separation of acetylene from gaseous mixtures in which the gaseous mixture is brought into contact with a solvent capable of dissolving acetylene selectively from the gaseous mixture and the solvent containing dissolved acetylene subsequently is heated to liberate acetylene and the solvent from which the acetylene is liberated is returned for dissolving more acetylene; the improvement which comprises heating the gaseous mixture prior to bringing it into contact with the solvent, scrubbing the effluent gas which is not dissolved by the solvent with a liquid absorbent capable of dissolving the solvent and having a higher boiling point than the solvent, separating the dissolved solvent from the liquid absorbent by scrubbing the incoming heated gaseous mixture therewith before separation of acetylene from said gaseous mixture, and returning the liquid absorbent for further use in recovering solvent.

6. In the separation of acetylene from gaseous mixtures in which the gaseous mixture is brought into contact with a solvent capable of dissolving acetylene selectively from the gaseous mixture and the solvent containing dissolved acetylene subsequently is heated to liberate acetylene and the solvent from which the acetylene is liberated is returned for dissolving more acetylene; the improvement which comprises heating the gaseous mixture prior to bringing it into contact with the solvent, scrubbing the acetylene liberated from the solvent and the effluent gas which is not dissolved by the solvent with a liquid absorbent capable of dissolving the solvent and having a higher boiling point than the solvent and separating the dissolved solvent from the liquid absorbent by scrubbing the incoming heated gaseous mixture therewith before separating acetylene therefrom.

7. In the separation of acetylene from gaseous mixtures in which the gaseous mixture is brought into contact with a solvent capable of dissolving acetylene selectively from the gaseous mixture and the solvent containing dissolved acetylene subsequently is heated to liberate acetylene and the solvent from which the acetylene is liberated is returned for dissolving more acetylene; the improvement which comprises heating the gaseous mixture prior to bringing it into contact with the solvent, scrubbing the acetylene liberated from the solvent and the effluent gas which is not dissolved by the solvent with a liquid absorbent capable of dissolving the solvent and having a higher boiling point than the solvent, separating the dissolved solvent from the liquid absorbent by scrubbing the incoming heated gaseous mixture therewith before separating acetylene therefrom, and delivering the separated solvent with the incoming gaseous mixture to the solvent employed in the initial separation of acetylene from the gaseous mixture.

FREDERICK R. BALCAR.